Nov. 17, 1953 G. X. N. POTIER 2,659,768

MULTIPLEX PULSE TRANSMISSION SYSTEM

Filed Feb. 1, 1951 3 Sheets-Sheet 1

INVENTOR
GASTON XAVIER NOEL POTIER
By:
Haseltine, Lake & Co.
AGENTS

Nov. 17, 1953 G. X. N. POTIER 2,659,768

MULTIPLEX PULSE TRANSMISSION SYSTEM

Filed Feb. 1, 1951 3 Sheets-Sheet 2

INVENTOR
GASTON XAVIER NOEL POTIER
By:
Haseltine, Lake & Co.
AGENTS

Nov. 17, 1953 G. X. N. POTIER 2,659,768

MULTIPLEX PULSE TRANSMISSION SYSTEM

Filed Feb. 1, 1951 3 Sheets-Sheet 3

INVENTOR
GASTON XAVIER NOEL POTIER
By: Haseltine, Lake & Co.
AGENTS

Patented Nov. 17, 1953 2,659,768

UNITED STATES PATENT OFFICE 2,659,768

MULTIPLEX PULSE TRANSMISSION SYSTEM

Gaston Xavier Nöel Potier, Versailles, France

Application February 1, 1951, Serial No. 208,892

1 Claim. (Cl. 179—15.6)

The object of the present invention is an improved method of multiple channel electrical communication by means of interleaved or intermingled recurrent electric pulse trains, based on the principle of division in time and the type of modulation called "pulse position modulation without fixed time reference."

More specifically, the object of the method according to the invention is the provision of multiplex systems in which intelligence corresponding to the various communication channels is represented by the time intervals between recurrent pairs of successive pulses, none of which has a fixed time position with respect to fixed periodic reference instants. Such a type of transmission is sometimes called a "multiplex pulse interval system."

It is known that in various methods for multiplex transmission by means of recurrent pulses, the total transmission time is supposed to be divided into equal time intervals of a duration T, themselves subdivided into equal and shorter elementary time intervals $T/(N+1)$, N being the number of communication channels and an $(N+1)^{th}$ elemental time interval being reserved for a synchronization signal (often called a pilot signal), not subjected to any modulation and which is given a particular shape, allowing it to be easily identified by the receiving apparatus and used for the synchronization thereof. It is not indispensable that all the time intervals reserved for each channel be equal, but this arrangement is generally adopted as being simpler in practice.

In such systems, inside each channel time interval, a pulse is generated, the position of which may be varied in time, as a function of the instantaneous amplitude of the corresponding channel modulation signal. It should be understood that by "time position" of a pulse is meant the time interval existing between a reference instant fixed with respect to the ends of the duration of the time interval assigned to one channel and the time when this pulse is generated if it is of a very short duration. If the pulse has an appreciable duration, the instant of its beginning will serve for defining its position in time, designated hereinafter more briefly as the "position." All the pulses transmitted within the time T will be called a "pulse group." A "pulse train" will be the whole of the pulses corresponding to one given channel.

Such multiplex transmission methods offer numerous advantages, but, however, they offer the drawback that in the case of a system with a very large number of channels they do not benefit from the statistical advantage existing in carrier current multiplex systems using an amplitude or frequency modulation, as each elementary time interval assigned to one channel remains absolutely inactive if, at a given instant, no modulation signal is present on said channel.

The statistical effect just mentioned has been particularly studied in a paper by B. D. Holbrook and J. T. Dixon entitled "Load rating theory for multi-channel amplifiers," published in the Bell System Technical Journal for October 1939, volume XVIII, pages 624 to 644. The results of this work are numerical data on the importance of said statistical effect. It may be noted that in the case of a telephone transmission, the peak value of the signal is seldom reached and that, in case it is limited by clipping in such a manner that the clipping level be reached during 1% of the time, there will be during 90% of the time an instantaneous level at most equal to one quarter of the clipping level. In such a pulse system using position modulation, this amounts to saying that three quarters of the duration of the time interval assigned to each channel are generally unused. In a system including a large number of channels, in which account must be taken of the fact that the modulations of the various channels do not add up arithmetically, but according to the laws of probability, this effect is still more pronounced.

To take advantage of this statistical effect, therefore, systems have been proposed, in which the duration of an elementary time interval is reserved for a channel pulse only during the time when this total duration is effectively utilized, which allows, during the complementary time, to move the next pulse closer thereto.

In a system utilizing such an arrangement it would be possible to increase the number of communication channels transmitted with respect to what exists in conventional systems, or, on the contrary, for a fixed number of channels, to increase the value of the displacement of the position of one channel pulse and, consequently, the signal to noise ratio.

The above mentioned possibility has already been taken advantage of in certain multiplex transmission systems proposed. Such a system has already been described in the French Patent No. 946,345 of April 26, 1947, in the name of P. F. M. Gloess, in which the instantaneous position of a channel pulse is affected by all the modulations from a number of other channels and in the prior U. S. patent application Serial No. 83,302, filed March 25, 1949, in the names of P. F. M. Gloess and L. J. Libois, which concerns a modification in which the modulation applied to each pulse includes the normal alternating telephone signal to which a D. C. component has been added, proportional to the amplitude of said signal as proposed in the French Patent No. 870,474 of February 28, 1941, in the name of the corporation "Le Materiel Telephonique" for electrical switching and signalling systems.

The various systems thus proposed offer the common characteristic that, while in the absence of any modulation, the N communication pulses of an N-channel system are grouped in the vicinity of one end of the time interval T reserved for a pulse group and then occupy only a small portion of this time interval, the position modulations of the pulses of the various channels have an additive character. For instance, if it is assumed that, in the absence of any modulation, all the communication pulses are grouped in the vicinity of the pilot pulse, at the beginning of the time interval T, the modulation of the first channel will have the effect of displacing the instantaneous position of the corresponding pulse with respect to the pilot pulse, the modulation of the second channel will have the effect of displacing the position of the corresponding pulse, by an amount proportional to this modulation, with respect to the instantaneous position of the pulse corresponding to the first channel, and so on.

Briefly, the modulation of a given channel is represented in proportion by the time interval between the pulse corresponding to this channel and the previous pulse, the latter being merely the pilot pulse in the case of the first channel (see "Telemetering from V-2 rockets," by V. L. Heeren et al., Electronics, March 1947, page 100, particularly Figure 4). It will be imagined that, owing to the above mentioned statistical effect, it is then possible to give each pulse, for the same modulation signal, a larger displacement in position than would be the case if said pulse had to remain always inside a time interval invariably assigned to the corresponding channel.

In the various pulse transmission systems utilizing this type of "additive" modulation, it has been found advantageous, further, when the modulation to be transmitted is a telephone signal or the like, of an essentially alternating character, to add to it a D. C. component substantially proportional to the instantaneous amplitude of the signal. This arrangement offers the advantage that the modulation signals then take on a unipolar character, the corresponding position displacements of the pulses being of a variable magnitude but occurring always in the same direction. It will be easily understood that this is a necessary condition if it is desired to take advantage of the statistical effect for both the positive and negative semi-periods of the telephone signal.

The various known methods for putting into practice this type of pulse transmission offer, however, certain difficulties for their realization, especially for signal demodulation by the receiving apparatus.

An object of the present invention is a transmission method (sending and receiving), making it possible to obviate these difficulties.

The method which is an object of the present invention is, at the same time, a particular sending method making it possible to realize in a simple manner the above described type of transmission, and a receiving method making it possible to restore the modulation signals originally applied to the various communication channels, owing to a particular selecting device, taking into account the fact that the elementary time intervals assigned to each pulse train, in this transmission system, have no fixed positions with respect to the synchronization pulses or with respect to predetermined reference instants.

The method according to the invention consists, in a characteristic manner, at the sending end, in measuring, at instants equidistant in time, at the frequency of the pulse groups, the instantaneous amplitude of each one of the modulation signals to be transmitted, in storing the amplitudes thus measured for a certain time, preferably equal to the duration of one pulse group, in using the stored amplitude corresponding to the first communication channel for defining a time interval counted from the pilot pulse or from a reference instant fixed with respect to said pilot pulse and proportional to the stored amplitude corresponding to the first communication channel, a first communication pulse corresponding to said first channel being sent at the end of said time interval, in using this first pulse and the stored amplitude corresponding to the second channel for defining a second time interval counted from said first pulse and proportional to said stored amplitude corresponding to the second channel, second communication pulse being sent at the end of said second time interval, in operating in the same manner until all channels and all pulses are exhausted, and in staggering in time the various pulse sendings in such a manner that, even in the absence of any modulation, two different pulses can never coincide in time.

Alternately, it is possible, according to a modification of the method of the invention, to distribute in time the various communication pulses by means of successive partial delays introduced after the generation of each one of said pulses after it has received its final position modulation and before it is utilized for defining the instant taken as an origin for the time interval proportional to the modulation of the next channel.

It is this modification of the method according to the invention which is made use of in the embodiment described hereinafter.

At the receiving end, the method consists in first separating by any known means, the pilot pulse from the other pulses, in using said pilot pulse for the generation of auxiliary pulses at a constant frequency equal to that of the pulse groups, in measuring the successive time intervals separating the pulses and in deriving therefrom electrical values proportional to said time intervals, which are collected in distinct circuits equal in number to said time intervals, and consequently to that of the communication channels, in storing for a certain time these electrical values and in utilizing them for modulating in amplitude (or in duration) and proportionally to said values the auxiliary pulses of constant frequency, in demodulating said auxiliary pulses by known means for obtaining signals proportional to the original modulation signals and in directing the demodulation products obtained toward utilization circuits.

With the usual modulation methods for realising the same type of transmission, crosstalk is introduced in each communication channel by the fact that the time separating two consecutive analyses of the modulating signal at the sending end and two consecutive restitutions of this same modulating signal at the receiving end is not constant.

An advantage of the method which is an object of the invention lies in the fact that the time separating two consecutive analyses or two restitutions of the same channel modulating signal is constant, although the time separating two consecutive pulses corresponding to this same channel is variable according to the very principle of transmission adopted.

The use of a common principle for measuring and storing, both at the sending and receiving ends, makes it possible, in the method according to the invention, to restore to the instantaneous amplitudes derived from the modulation signal the suitable equidistance, both at the receiving and sending ends. It is then always possible, whatever the number of channels, to make a maximum use of the time reserved for each pulse train either for improving the signal to noise ratio or for decreasing the bandwidth necessary for transmission.

The above-described method necessitates the use of complementary transmitting and receiving equipment in a communication system for carrying out the said method, as it is obvious that otherwise undesirable and possibly prohibitive cross-talk and distortion would occur, due to lack of proper synchronization between the "sampling" of modulation signals at the transmitting end and their restitution at the receiving end.

A particular embodiment of such a communication system will now be described by way of example without in any way limiting the scope of the method which is the object of the invention. It will be obvious to any expert in the art that in particular the storing device hereinafter described could be replaced by various known devices, such as storage electronic tubes, for instance. Other elements involved, such as modulators, generators, synchronizing devices and demodulators may in practice be of any suitable design.

Other features and objects of the invention will be better understood from the following description with reference to the appended drawings, wherein.

Figure 1:
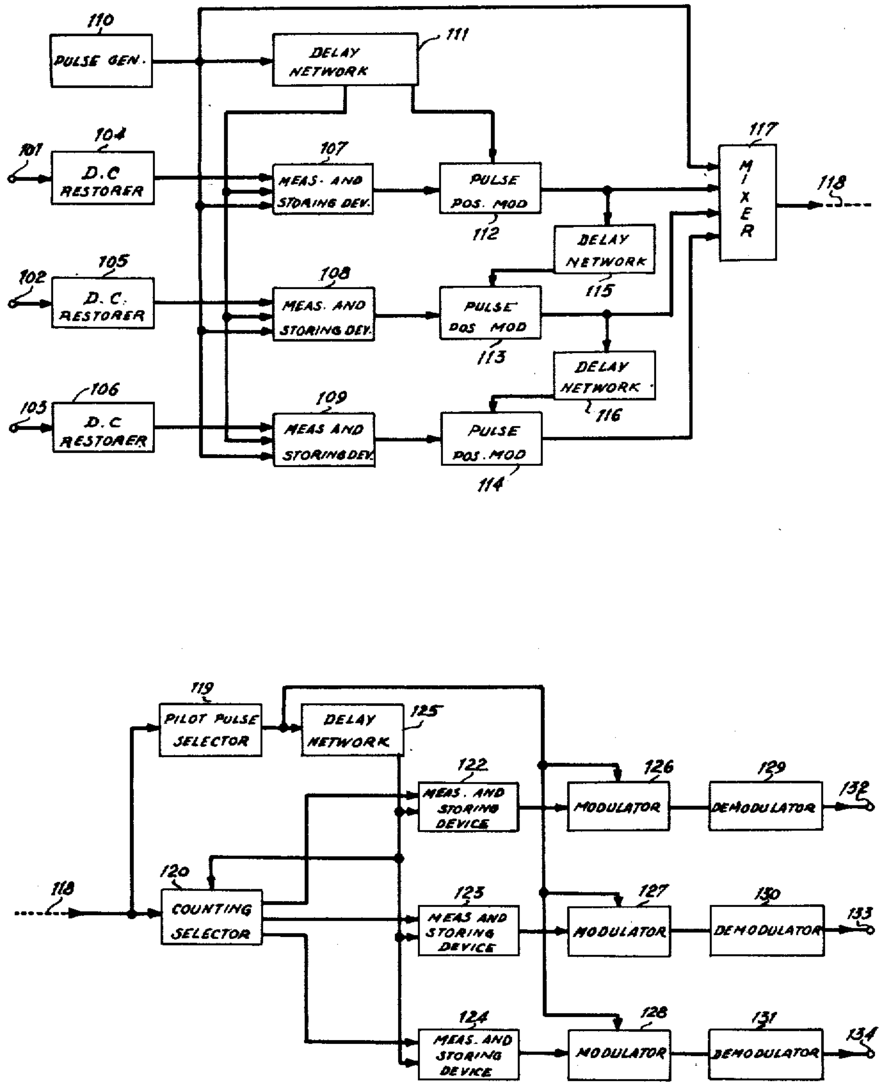
Figure 1 shows, schematically, one type of embodiment of the device for applying the method of the invention.
Figure 4:
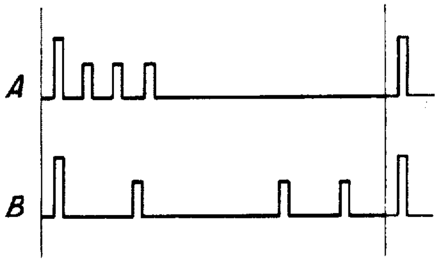
Figure 5:
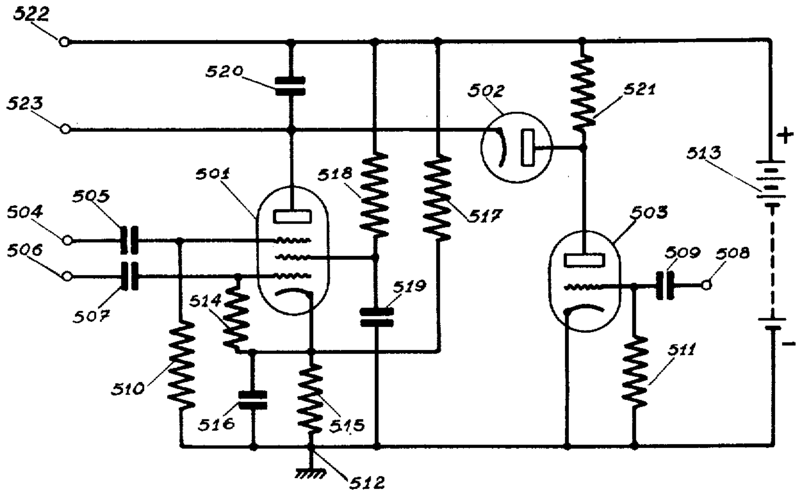
Figure 6:
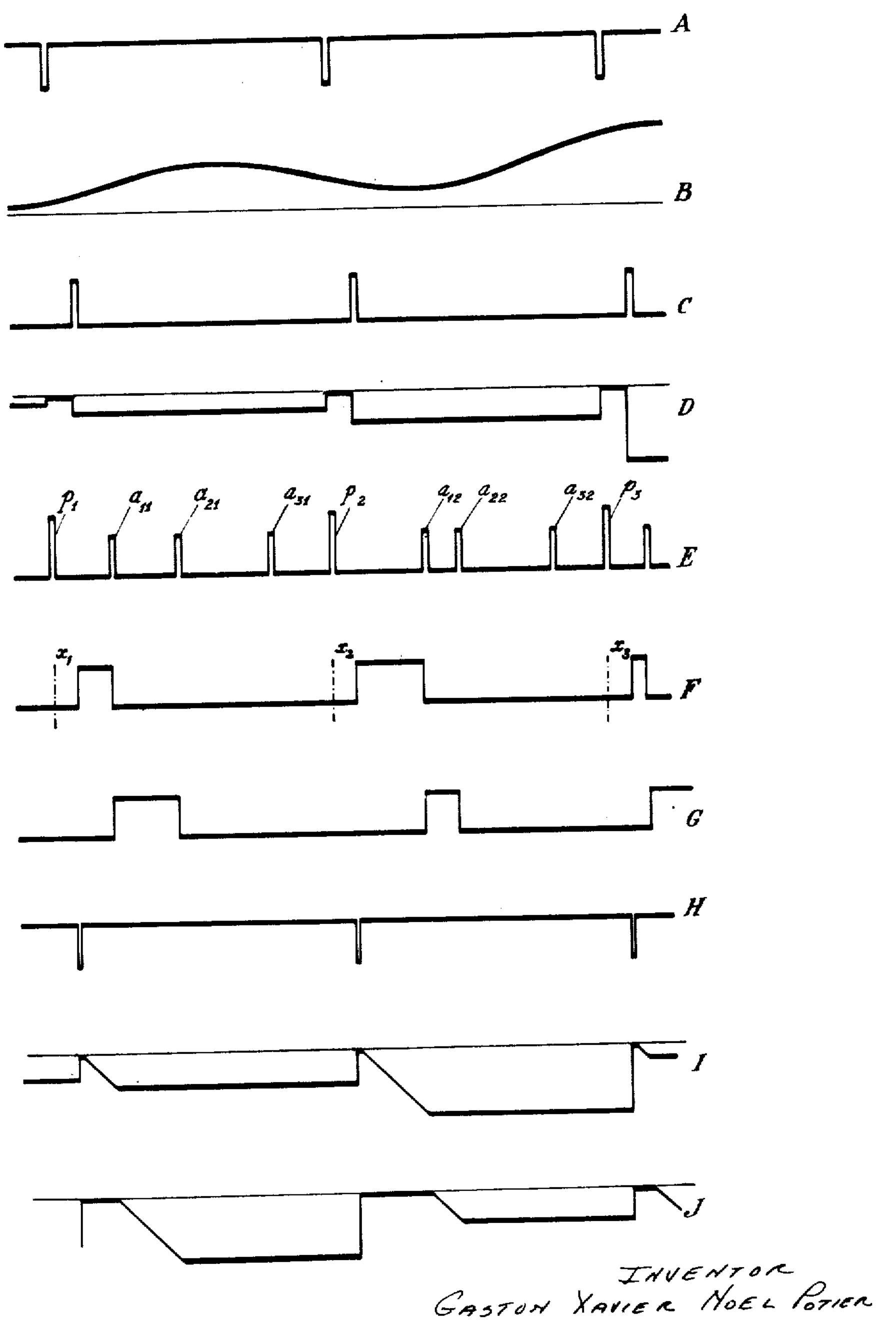

Figure 4 shows, in line A, the time positions, with respect to the ends of a time interval of a duration equal to that of a pulse group, of the pilot pulse, distinguished by its larger amplitude, and of channel pulses, in case there is momentarily no modulation signal on any communication channel, while the same figure, in line B, represents the time positions of the same pulses when modulation signals are present on the communication channels;

Figure 5 shows, schematically, a measuring and storing device involved in the transmission system of Figure 1 and capable of measuring and storing the amplitude of a modulation signal or the time interval between two pulses; and Figure 6 is a diagram of the electrical voltages existing at various points of the transmission system.

For greater simplicity, it has been assumed, in the following description and in the figures, that the transmission system described comprises only three communication channels and that the modulation signals are telephone signals, but it should be clearly understood that the invention may be applied, just as well, to systems comprising a much larger number of communication channels or to the transmission of other types of communication signals.

Figure 2:
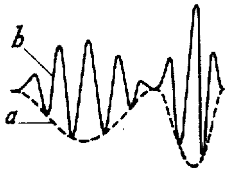
Figure 2 shows the diagram, as a function of time, of a modulation signal, such as it usually exists, for instance in a telephone circuit.
Figure 3:
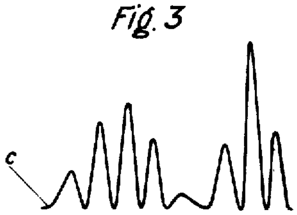
Figure 3 shows the diagram, as a function of time, of a modulation signal with a superposed D. C. component, such as it is proposed to use in the method of the invention.

The operation of the device of Figure 1 may be explained as follows:

The modulation signals from the three communication channels are respectively applied at 101, 102, 103 to three D. C. restorers 104, 105, 106 adding to them, by well known means, the D. C. component necessary to make them unipolar and to transform their wave shape from that of Figure 2 to that of Figure 3. Upon their issuing from 104, 105, 106, the modified signals thus obtained are respectively applied to one of the inputs of three measuring and storing devices 107, 108, 109, the operation of which will subsequently be explained in detail. These measuring and storing devices are also energized by two series of periodic pulses from a generator of pulses of short duration 110, which generates them with the period T of the pulse groups, i. e. at the pilot pulse frequency. The pulses from 110 are applied, through a delay network 111 to a second input of each one of the measuring and storing devices 107, 108 and 109 and, on the other hand, directly to a third input thereof, for the purpose of setting them at rest at the end of each working period T. The function of the measuring and storing devices is to measure and store, for a certain time, slightly less than the duration of one pulse group, the instantaneous amplitude of the modified modulation signals applied to one of their inputs at 104, 105, 106. The stored instantaneous amplitudes appear in the form of electrical voltages at the outputs of 107, 108, 109 and are applied to pulse position modulators of the conventional type, 112, 113, 114. The delay obtained with the network 111 being small in value and being only for the purpose of separating sharply the instant at which the signals from 104, 105, 106 are measured from that at which the pilot pulse is generated, electrical voltages with values proportional to the stored amplitudes of the respective modulation signals are present at the outputs of 107, 108, 109 during almost the whole duration T of each pulse group. These electrical voltages will be called hereinafter "stored modulation signals."

The function of the position modulators 112, 113, 114 is to delay, by an amount proportional to the stored modulation signals which are respectively applied to one of their inputs, the time or time position of the pulses which are applied at their other input. The principle and operation of such position modulators are well known in the pulse technique. It is known that position modulated pulses are generally obtained by a differentiation of duration modulated pulses and numerous methods of duration modulation are known at present and may be utilized here. One may mention, for instance, the one described in the French Patent No. 912,617, of July 20, 1945, in the name of Patelhold Patentverwertungs & Elektroholding A. G.

In Figure 1, the position modulator 112 corresponding to the first communication channel, is thus energized on the one hand by the stored modulation signal from 107, and on the other hand by a delayed pulse, by means of the delay network 111, with respect to the pilot pulse, by an amount greater than the delay (itself given by a portion of the network 111) of the analysis pulse applied to the second input of 107 with respect to the pilot pulse, in order that the position modulation may be effected in the modulator 112 only after the end of the measurement in the measuring and storing device 107.

The result, at the output of 112, is the production of a communication pulse which is directed on the one hand toward the mixer 117, the function of which will become apparent further on, and, on the other hand, after being slightly delayed by a delay network 115, toward one of the inputs of the position modulator 113, at the other input of which is applied the stored modulation signal from 108, and corresponding to the second communication channel. There is thus obtained, at the output from 113, a second communication pulse delayed with respect to the first one by an amount proportional to the amplitude stored by 108. This second pulse, in turn, is directed toward 117 and after being slightly delayed by a delay network 116, is utilized with respect to the third position modulator 114 like the first one with respect to 113.

All these pulses are applied to a mixer 117, which, as will be seen on Figure 1, comprises four inputs, corresponding respectively to the pilot pulse and to the communication pulses, and one output. This mixer is a simple device which makes it possible to apply to one output circuit signals from several input circuits. The need for the delay networks 115 and 116 is due to the fact that in case of momentarily zero modulation signals on one or more communication channels, the possibility of two or more pulses coinciding in time must be avoided.

In practice, the delay networks 115 and 116 may often be dispensed with, as a slight delay already exists in most known types of modulator. An alternative method for precluding the possibility of two pulses coinciding in time in case of zero modulation of one channel would be to add to each modified modulation signal a small and permanent direct-current component.

The pulse group from 117 is then directed toward the transmission channel 118 and transmitted by any known means to the receiving end thereof.

At the receiving end, the group of pulses is first applied in parallel to two pieces of apparatus, the first one of which, 119, is a pilot pulse selector for ensuring the production of local synchronization pulses of period T, and that of auxiliary pulses of the same period, the function of which will be explained later. The second apparatus is a pulse selector 120, of the so-called "counter" type, which has as many outputs as there are communication channels, and delivers, at its $n^{th}$ output, a pulse of constant amplitude having a duration equal to the time interval between the $(n-1)^{th}$ and the $n^{th}$ communication pulse.

Such an apparatus comprises as many electronic flip-flop circuits as there are communication channels, each one of these flip-flop circuits being connected with one of the outputs of the apparatus. It also has two inputs. The pilot pulse and the communication channel pulses are applied simultaneously to all flip-flop circuits at the first input to the apparatus. A special pulse, called an "initial condition restoring pulse," which is merely the pilot pulse from 119 delayed by the delay network 125 is applied, through the second input to the apparatus, to the first flip-flop stage.

The initial condition restoring pulse sets the first flip-flop circuit "working." The pilot pulse and communication channel pulses set at rest the flip-flop circuit which is "working." Further, a so-called "interstage" pulse is sent by the flip-flop circuit which is set at rest to the next flip-flop circuit through an "interstage" connection, and sets the latter "working." There is no interstage connection, however, between the first and last flip-flop circuits of the apparatus.

The operation is as follows:

The "initial condition restoring pulse" sets the first flip-flop "working." The first communication channel pulse sets this first flip-flop "at rest." Simultaneously, an "interstage" pulse sets the second flip-flop "working." There is obtained, at the first output of the apparatus, a pulse of constant amplitude the duration of which is equal to the time interval separating the initial condition restoring pulse from the first communication channel pulse.

The second communication channel pulse sets "at rest" the second flip-flop which was "working." Simultaneously, an "interstage" pulse sets the third flip-flop "working." There is obtained, at the second output of the apparatus, a constant amplitude pulse the duration of which is equal to the time interval separating the first communication channel pulse from the second communication channel pulse. The operation is continued in a similar manner for the other flip-flops. However, when the $n^{th}$ (or last) communication channel pulse sets the $n^{th}$ (or last) flip-flop at rest, no interstage pulse is sent to the first flip-flop which will have to wait for the arrival of the initial condition restoring pulse to pass to the "working" condition.

The "counter" selectors such as 120 are described, for instance, under the designation of "trigger stages having interconnections to give broken ring action," in a paper by Lawrence Lee Rauch entitled "Electronic commutation for telemetering," published in Electronics for February 1947.

In the case of a system with a small number of channels there could also be used, for 120, a selector the operation based on the shape of the communication pulses which could receive, in correlation with their sending, different shape according to their rank.

The signals issued from the various outputs of the counting selector 120 are thereafter respectively directed, according to the rank of the channel they represent, toward one of the corresponding measuring and storing devices 122, 123, 124, which are similar to 107, 108, 109 used in the sending equipment and to the second input of which said signals are applied, no signal being in this case applied to their first input.

The second inputs of 122, 123, 124 are thus energized by signals from the outputs of 120. The duration of the pulses from one of these outputs is equal to the time separating the pulse of the channel corresponding to said output from the pulse which immediately precedes it and, consequently, to the instantaneous value of the modulation signal corresponding to this channel. The measuring and storing devices 122, 123, 124, thus measure and store, in the shape of electrical voltages appearing at their outputs, values proportional to the duration of the pulses from the output of 120, to which they are connected, and consequently to the instantaneous amplitude of the corresponding modulation signal.

The measuring and storing devices 122, 123, 124 are periodically set at rest by the pilot pulse applied to their third input and slightly delayed by the delay network 125, the function of which is to avoid the setting at rest of the measuring and storing devices before their output voltage has been utilized by the following apparatus energized by auxiliary pulses derived from the pilot pulse.

The output voltages from 122, 123, 124 are then applied respectively to the inputs of amplitude or eventually duration modulators 126, 127, 128, energized, on the other hand, by periodic auxiliary pulses derived from the pilot pulse from 119. The signals obtained at the output from 126, 127, 128 are thus modulated proportionally to the original modulation signals and can then be applied respectively to the amplitude demodulators (or duration demodulators) 129, 130, 131, whence, after demodulation, they are directed towards utilization circuits 132, 133, 134.

The operation of a measuring an scoring device will be better understood by referring to Figure 5 which shows this apparatus schematically, and to the diagram of Figure 6 which shows the time variation of the electrical voltages existing at various points in the transmission system.

As already mentioned, the measuring and storing device, the diagram of which is given in Figure 5, is an apparatus comprising three inputs and one output and which, when a time variable electrical voltage is applied to its first input and a control pulse to its second input, causes the appearance, at its output terminals, of a voltage proportional to the value of said time variable voltage at the time of application of the control pulse. This voltage at the output terminals of the apparatus is stored until the time of apparition of a rest setting pulse applied to the third input to the apparatus.

The measuring and storing device comprises essentially a pentode tube 501, a diode 502 and a triode 503. The first input to the apparatus is comprised of the terminal 504, connected through the condenser 505 to the suppressor grid of 501, the second input of the terminal 506 connected through the condenser 507 to the control grid of 501. The third input is the terminal 508 connected through the condenser 509 to the grid of the triode 503. The suppressor grid of 501 and the grid of 503 are respectively connected through resistances 510, 511 to the negative terminal 512 of a D. C. high voltage source 513 energizing the whole. The control grid of 501 is connected through a resistance 514 to the cathode of the same tube. The voltages applied to the various inputs are applied respectively between 504, 506 and 508 on one hand and 512 on the other hand.

The cathode of 501 is connected to 512 through a resistance 515 in parallel with a de-coupling condenser 516 and also, through a resistance 517 to the positive terminal of 513, so as to give this cathode a suitable permanent bias. The screen of 501 is energized from this same positive terminal through a resistance 518 and de-coupled at 512 by a condenser 519. The anode of 501 is connected through a condenser 520 with the positive terminal of 513, and to the cathode of the diode 502, the anode of which is connected directly with the anode of the triode 503 and, through a resistance 521, with the positive terminal of 513. The output terminals of the apparatus are terminals 522, 523 of the condenser 520.

The operation is as follows: Control pulses of a sufficiently high positive amplitude being applied at 506, the control grid of 501 assumes, if the assembly 507–514 has a time constant sufficiently large with respect to the recurrence period of said pulses, an average voltage such that the pulse peak corresponds to a grid voltage close to the cathode potential, while, during the time separating the pulses, the cathode current is zero. In such conditions, the tube 501 is operating in a linear portion of its anode current/suppressor grid characteristic at the time of the peak of the control pulses and a voltage proportional to the instantaneous value of the voltage applied at 504 appears at the terminals 522, 523 of 520. This voltage is stored until such time when 520 is discharged through 502 under the action of a rest setting pulse of a negative polarity applied at 508 to the grid of 503 through the condenser 509.

When the apparatus is used at the sending end, it is arranged for the control pulse which is obtained from the generator 110, after the delay introduced by a fraction of 111, to occur shortly after the rest setting pulse which is merely the pilot pulse generated by 110. The amplitude of the modulation signal from 101, 102 or 103 and modified by 104, 105 or 106 is thus measured periodically shortly after the apparition of each pilot pulse and stored at the output terminals of 107, 108 or 109 until the appearance of the next pilot pulse.

When the apparatus is used at the receiving end, no signal is applied to the first input while the second one receives the pulses from the counting selector 120. The charge taken by the capacity 520 is then proportional to the duration of the pulses, i. e. finally, to the instantaneous value of the modulation signal.

The operation of a measuring and storing device, at the sending or receiving ends, will be better understood by an inspection of Figure 6, in which:

Line A represents the diagram, as a function of time, of the pilot pulses applied, in the form of rest setting pulses, to the third input of a sending and measuring and storing device.

Line B represents the diagram, as a function of time, of a modified modulation signal such as applied to the first input of this sending end measuring and storing device.

Line C shows the diagram, as a function of time, of the control pulses applied to the second input of this sending end measuring and storing device.

Line D shows the diagram, as a function of time, of the signals collected at the output from this sending end measuring and storing device, their magnitude being counted from the upper horizontal line.

Line E shows the diagram, as a function of time, of the pulse groups received at the input to the receiving end of the transmission system. $p_1$; $p_2$; $p_3$ are the pilot pulses, $a_{11}$, $a_{12}$ . . . the pulses corresponding to the first communication channel and to the first, second, . . . groups, $a_{21}$, $a_{22}$ . . . the pulses corresponding to the second communication channel, and to the first, second . . . groups, etc.

Line F shows the diagram, as a function of time, of the pulses applied to the second input of the receiving end measuring and storing device 122. In the particular case of this measuring and storing device 122, the duration of these pulses is equal to the time separating the initial condition restoring pulse applied to the selector 120 (pulse from line H, which is also the rest setting pulse of the measuring and storing device 122), of the first channel pulse. In other words, the duration of the pulse applied to the second input of 122 is not equal to the time separating the pilot pulse (such as $p_1$, corresponding to $x_1$ on line F), of the first channel pulse, but it is clipped by a constant duration equal to that separating the pilot pulse from the initial condition restoring pulse of the selector 120, i. e. equal to the delay introduced by the device 125.

Line G shows the diagram, as a function of time, of the pulses applied to the second input of the receiving end measuring and storing device 123. The duration of these is equal to the time separating the first channel pulse (such as $a_{11}$) from the second channel pulse (such as $a_{21}$).

Line H shows the diagram, as a function of time, of the rest setting pulses applied to the third input of the various measuring and storing devices.

Line I shows the diagram, as a function of time, of the electrical voltage obtained at the output from the measuring and storing device 122, the amplitude of which is counted from the upper horizontal line.

Line J shows the diagram, as a function of time, of the electrical voltage obtained at the output from the measuring and storing device 123, the amplitude of which is counted from the upper horizontal line.

Lines A, B, C, D, of Figure 6 show clearly the operation of the measuring and storing system for the instantaneous amplitudes of the modulation signals at the sending end.

Lines E to J of the same figure show the operation of the receiving system.

The voltage picked up at the output from the measuring and storing devices 122 and 123 is represented by lines I and J of Figure 6, the rest setting pulses represented by line H being delayed with respect to the pilot pulses so that the auxiliary pulses actuating the modulators 126, 127 and 128 do not coincide in time with the rest setting pulses, which would have the effect of reducing to zero the voltage obtained at the output from the measuring and storing device at the precise moment when it is desired to use it.

Although the present invention has been described, by way of example, with reference to certain particular embodiments, it should be understood that said embodiments may be replaced by others giving an equivalent result and which can easily be imagined by an expert in the art.

What is claimed is:

In a time division multiplex electric pulse communication system including an integer number N of communication channels, each of which transmits a modulation signal consisting of a signal voltage varying in time, said system using N interleaved trains of recurrent communication pulses and at least one train of periodic synchronization pulses of period T, a communication link having a transmitting end and a receiving end, a transmitting device comprising a pulse generator of a basic frequency generating periodic pulses of period T, a first delay network fed from said generator and delivering delayed pulses of same said basic frequency, direct-current restorers in number N respectively modifying said modulation signals so as to transform them into unipolar signals, measuring and storing devices in number N for periodically measuring the instantaneous amplitude of each of said modified modulation signals and storing its measured amplitude as an electric voltage, each of said devices having input and output terminals and being controlled on one hand by control pulses from said generator and on the other hand by delayed pulses from said first delay network, means for respectively applying each of said modified modulation signals from each one of said direct-current restorers to input terminals of one corresponding measuring and storing device, a first position modulator fed on one hand from the output terminals of a first of said measuring and storing devices and on the other hand from delayed pulses from said first delay network, a second position modulator fed on one hand from the output of said first position modulator and on the other hand through a second delay network from the output terminals of a second of said measuring and storing devices, further position modulators associated with each other through further delay networks and with further measuring and storing devices in the same way as said first and second position modulators are associated with said first and second measuring and storing devices and in sufficient number for allowing utilization of signals from all the N said measuring and storing devices, means for impressing all position modulated pulses from all of said modulators together with non-modulated synchronization pulses derived from said generator upon the sending end of said communication link, means for impressing all the pulses received at the receiving end of said communication link upon said receiving device, said receiving device comprising a synchronization pulse selector segregating the synchronization pulses from the other received pulses, a counting pulse selector with its input fed from all the received pulses and controlled by control pulses derived from said synchronization pulse selector and delivering at N pairs of output terminals N output signals of constant amplitude and of duration respectively proportional to the time intervals separating two successive pulses pertaining to two adjacent trains of received pulses, said counting pulse selector respectively directing each one of said constant amplitude signals towards one of N different circuits selected according to the time of occurrence with respect to the synchronization pulses of said two successive pulses, a number N of measuring and storing devices each respectively fed at its input terminals from one of said N different circuits and controlled by periodic pulses issued from said synchronization pulse selector, each said measuring and storing device storing for a predetermined time interval at most equal to T a voltage proportional to the duration of that one of said constant amplitude signals which is applied to its input terminals and delivering said voltage at its output terminals, amplitude modulators in number N respectively fed on one hand from voltage delivered at output terminals of each one of said measuring and storing devices and on another hand from pulses from said synchronization pulse selector, demodulators each respectively fed from the output of one of said amplitude modulators and means for impressing signals from the output of each one of said demodulators upon one of N corresponding utilization circuits.

GASTON XAVIER NÖEL POTIER.

References Cited in the file of this patent

UNITED STATES PATENTS

| Number | Name | Date |
|---|---|---|
| 2,449,467 | Goodall | Sept. 14, 1948 |
| 2,570,010 | Staal | Oct. 2, 1951 |

Certificate of Correction

Patent No. 2,659,768 November 17, 1953

Gaston Xavier Nöel Potier

It is hereby certified that error appears in the above numbered patent requiring correction as follows:

In the heading to the printed specification, between lines 4 and 5, insert *Claims priority, application France February 7, 1950*;

and that the said Letters Patent should be read as corrected above, so that the same may conform to the record of the case in the Patent Office.

Signed and sealed this 18th day of May, A. D. 1954.

[SEAL]

ARTHUR W. CROCKER,
*Assistant Commissioner of Patents.*